(12) United States Patent
Park et al.

(10) Patent No.: US 11,620,851 B2
(45) Date of Patent: Apr. 4, 2023

(54) METHOD AND APPARATUS FOR DETERMINING THE LEVEL OF DEVELOPED FINGERPRINT

(71) Applicant: REPUBLIC OF KOREA (NATIONAL FORENSIC SERVICE DIRECTOR MINISTRY OF THE INTERIOR AND SAFETY), Wonju-si (KR)

(72) Inventors: Nam Kyu Park, Bucheon-si (KR); Byung Seon Moon, Busan (KR); Jae Mo Goh, Wonju-si (KR); Jin Pyo Kim, Daejeon (KR); Young Il Seo, Wonju-si (KR); Eun Ah Joo, Yongin-si (KR); Je Hyun Lee, Wonju-si (KR); Sang Yoon Lee, Wonju-si (KR); Ho Yong Yie, Wonju-si (KR)

(73) Assignee: REPUBLIC OF KOREA (NATIONAL FORENSIC SERVICE DIRECTOR MINISTRY OF THE INTERIOR AND SAFETY), Wonju-si (KR)

( * ) Notice: Subject to any disclaimer, the term of this patent is extended or adjusted under 35 U.S.C. 154(b) by 0 days.

(21) Appl. No.: 17/366,973

(22) Filed: Jul. 2, 2021

(65) Prior Publication Data

US 2022/0383017 A1 Dec. 1, 2022

(30) Foreign Application Priority Data

May 26, 2021 (KR) ........................ 10-2021-0067810

(51) Int. Cl.
*G06V 40/12* (2022.01)
*G06V 10/34* (2022.01)
*G06V 40/13* (2022.01)

(52) U.S. Cl.
CPC .......... *G06V 40/1376* (2022.01); *G06V 10/34* (2022.01); *G06V 40/13* (2022.01); *G06V 40/1353* (2022.01)

(58) Field of Classification Search
CPC ..... G06V 40/13; G06V 40/1353; G06V 10/34
See application file for complete search history.

(56) References Cited

U.S. PATENT DOCUMENTS

| 2016/0379038 | A1* | 12/2016 | Vural | G06V 40/1359 |
| | | | | 382/125 |
| 2019/0050659 | A1* | 2/2019 | Hwang | G06F 17/18 |
| 2020/0394378 | A1* | 12/2020 | Riehl | G06F 21/32 |
| 2021/0004562 | A1* | 1/2021 | Chiang | G06V 40/45 |

FOREIGN PATENT DOCUMENTS

KR 10-1495875 B1 2/2015

\* cited by examiner

*Primary Examiner* — Lixi C Simpson
(74) *Attorney, Agent, or Firm* — Hauptman Ham, LLP

(57) ABSTRACT

A developed fingerprint level determination apparatus includes: a fingerprint image acquisition unit configured to obtain at least two or more developed fingerprint images according to a fingerprint development technique; and a ridge level determination unit configured to check respective ridge development level information of the obtained fingerprint images and compare the respective ridge development level information with each other.

8 Claims, 7 Drawing Sheets

(a) (b) (c)

(a) (b) (c)

(a)          (b)          (c)

METHOD AND APPARATUS FOR DETERMINING THE LEVEL OF DEVELOPED FINGERPRINT

CROSS-REFERENCE TO RELATED APPLICATION

This application claims the benefit of Korean Patent Application No. 10-2021-0067810, filed on May 26, 2021, in the Korean Intellectual Property Office, the disclosure of which is incorporated herein in its entirety by reference.

BACKGROUND

1. Field

One or more embodiments relate to a method and an apparatus for determining the level of a developed fingerprint.

2. Description of the Related Art

In criminal cases, the analysis of fingerprints plays an important role in estimating suspects.

A latent fingerprint refers to a fingerprint shape that remains as evidence by natural secretions from human skin, but cannot be seen with the naked eye. Most fingerprints generated at crime scenes exist in the form of latent fingerprints. Therefore, the technique of developing these latent fingerprints to the naked eye is very important.

There are several dozen or more techniques of developing latent fingerprints depending on a target surface to be developed and the environment, and there are existing optimal techniques depending on the environment, but they are continuously developing.

When evaluating a fingerprint reagent or method for developing the technique of developing latent fingerprints, the superiority of the new technique is evaluated by comparing the levels of developed fingerprints with each other, but it is difficult to objectively evaluate the levels of developed fingerprints.

Therefore, in order to find the optimal condition of various latent fingerprint development techniques, it is necessary to objectively evaluate the levels of developed fingerprints according to the techniques to improve the reliability of a fingerprint evaluation.

[Prior art document] Korean Patent No. 10-1495875 (registered on Feb. 16, 2015)

SUMMARY

One or more embodiments include methods and apparatuses for determining the level of a developed fingerprint. In more detail, one or more embodiments include criteria for selecting a relatively superior fingerprint development method by, after obtaining an image of a developed fingerprint, evaluating the level of the developed fingerprint by deriving evaluation items that take into account ridges of the fingerprint and morphological individual features of the fingerprint, and by calculating a comprehensive probability value for each evaluation item.

In addition, one or more embodiments include methods and apparatuses for selecting an effective and excellent latent fingerprint development technique and reagent by more objectively evaluating reagents and techniques for latent fingerprint development.

According to one or more embodiments, a developed fingerprint level determination apparatus includes: a fingerprint image acquisition unit configured to obtain at least two or more developed fingerprint images according to a fingerprint development technique; and a ridge level determination unit configured to check respective ridge development level information of the obtained fingerprint images and compare the respective ridge development level information with each other.

According to one or more embodiments, a developed fingerprint level determination apparatus includes: a fingerprint image acquisition unit configured to obtain at least two or more developed fingerprint images according to a fingerprint development technique; and a fingerprint feature determination unit, by performing error removal and thinning of the obtained fingerprint images, configured to check respective morphological feature information of the obtained fingerprint images and compare the respective morphological feature information with each other.

According to one or more embodiments, a developed fingerprint level determination apparatus includes: a fingerprint image acquisition unit configured to obtain at least two or more developed fingerprint images according to a fingerprint development technique; a ridge level determination unit configured to check respective ridge development level information of the obtained fingerprint images and compare the respective ridge development level information with each other; and a fingerprint feature determination unit, by performing error removal and thinning of the obtained fingerprint images, configured to check respective morphological feature information of the obtained fingerprint images and compare the respective morphological feature information with each other.

In an embodiment, the ridge development level information of the obtained fingerprint image may include a contrast value, a signal-to-noise ratio, or orientation and continuity of a ridge, of the obtained fingerprint image.

In an embodiment, the morphological feature information of the obtained fingerprint image may include the existence and number of minutiae, cores, or deltas of a fingerprint in the obtained fingerprint image.

In an embodiment, the developed fingerprint level determination apparatus may further include a probability determination unit configured to relatively determine the level of a developed fingerprint based on a comprehensive probability value calculated by deriving evaluation items from the ridge development level information or the morphological feature information of the obtained fingerprint image.

In an embodiment, the comprehensive probability value may include a product of at least two or more of evaluation items including a contrast value, a signal-to-noise ratio, a core value, a delta value, or the number of minutiae, of the obtained fingerprint image.

According to one or more embodiments, a method of determining the level of a developed fingerprint includes: obtaining at least two or more developed fingerprint images according to a fingerprint development technique; checking respective ridge development level information of the obtained fingerprint images; and comparing the respective ridge development level information of the obtained fingerprint images with each other.

According to one or more embodiments, a method of determining the level of a developed fingerprint includes: obtaining at least two or more developed fingerprint images according to a fingerprint development technique; checking respective morphological feature information of the obtained fingerprint images by performing error removal and thinning of the obtained fingerprint images; and comparing the respective morphological feature information of the obtained fingerprint images with each other.

According to one or more embodiments, a method of determining the level of a developed fingerprint includes: obtaining at least two or more developed fingerprint images according to a fingerprint development technique; checking ridge development level information of the obtained fingerprint images; checking morphological feature information of the obtained fingerprint images by performing error removal and thinning of the obtained fingerprint images; and comparing the ridge development level information and the morphological feature information of the obtained fingerprint images with each other.

In an embodiment, the ridge development level information of the obtained fingerprint image may include a contrast value, a signal-to-noise ratio, or orientation and continuity of a ridge, of the obtained fingerprint image.

In an embodiment, the morphological feature information of the obtained fingerprint image may include the existence and number of minutiae, cores, or deltas of a fingerprint in the obtained fingerprint image.

In an embodiment, the method of determining the level of a developed fingerprint may further include relatively determining the level of a developed fingerprint based on a comprehensive probability value calculated by deriving evaluation items from the ridge development level information or the morphological feature information of the obtained fingerprint image.

A non-transitory computer-readable recording medium for recording a computer program for executing a method of determining the level of a developed fingerprint according to an embodiment is provided.

Additional aspects will be set forth in part in the description which follows and, in part, will be apparent from the description, or may be learned by practice of the presented embodiments.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
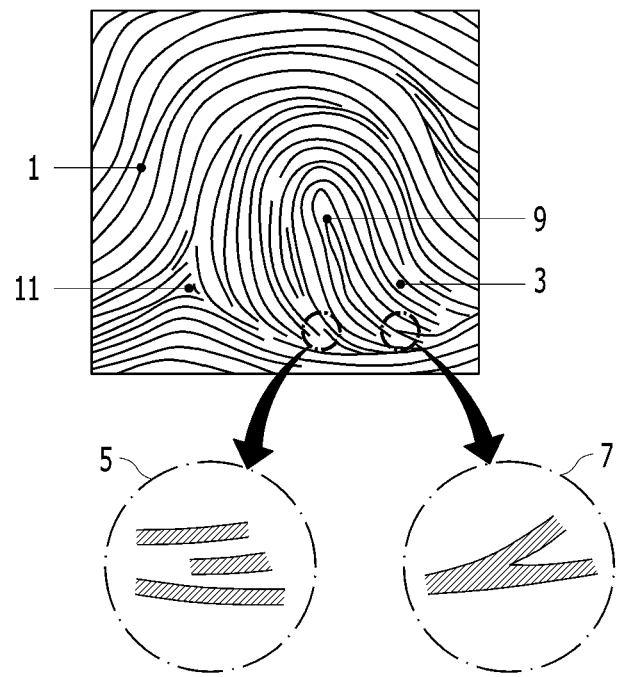
FIG. 1 is a view of a general fingerprint shape.

Hereinafter, embodiments will be described in detail with reference to the accompanying drawings. The same reference numerals are used to denote the same elements, and repeated descriptions thereof will be omitted.

It will be understood that although the terms "first," "second," etc. may be used herein to describe various components, these components should not be limited by these terms.

An expression used in the singular encompasses the expression of the plural, unless it has a clearly different meaning in the context.

It will be further understood that the terms "comprises" and/or "comprising" used herein specify the presence of stated features or components, but do not preclude the presence or addition of one or more other features or components.

It will be understood that when a layer, region, or component is referred to as being "formed on" another layer, region, or component, it can be directly or indirectly formed on the other layer, region, or component. That is, for example, intervening layers, regions, or components may be present.

Sizes of elements in the drawings may be exaggerated for convenience of explanation. In other words, since sizes and thicknesses of components in the drawings are arbitrarily illustrated for convenience of description, the following embodiments are not limited thereto. When a certain embodiment may be implemented differently, a specific process order may be performed differently from the described order. For example, two consecutively described processes may be performed substantially at the same time or performed in an order opposite to the described order.

It will be understood that when a layer, region, or component is connected to another portion, the layer, region, or component may be directly connected to the portion or an intervening layer, region, or component may exist. For example, when a layer, region, or component is electrically connected to another portion, the layer, region, or component may be directly electrically connected to the portion or may be indirectly electrically connected to the portion through another layer, region, or component.

In the specification, "fingerprint" refers to a pattern on the skin inside a human fingertip or a trace of it.

FIG. 1 is a view of a general fingerprint shape.

Referring to FIG. 1, the structure of 'fingerprint' may be expressed as follows. The fingerprint may be largely composed of a ridge 1, which is a line where the entrances of sweat glands in the skin of the human fingertip are raised, and a valley 3, which is the indentation between ridges. Minutiae of the fingerprint include an ending point 5 at which a ridge flows smoothly and then breaks, and a bifurcation point 7 at which a ridge flows smoothly and then splits. In addition, in the fingerprint, a core 9, which is the end of ridge rotation, and a delta 11, where ridge flows converge from three directions, may be observed.

Figure 2:
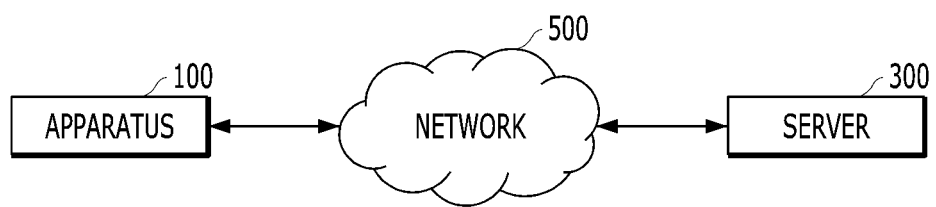
FIG. 2 is a view of a developed fingerprint level determination system according to an embodiment.

FIG. 2 is a view schematically illustrating a developed fingerprint level determination system according to an embodiment.

Referring to FIG. 2, the developed fingerprint level determination system according to an embodiment may include a developed fingerprint level determination apparatus 100, a server 300, and a network 500 connecting them.

The developed fingerprint level determination system according to an embodiment provides a level determination service of a developed fingerprint. In more detail, the developed fingerprint level determination system provided according to an embodiment may upload data obtained by a method of determining the level of a developed fingerprint that a user is experimenting with, and share the uploaded data with other users. For example, a user may upload data about a fingerprint image obtained by developing a specific latent fingerprint. The developed fingerprint level determination system according to an embodiment, when a user uploads data, registers the data in the server 300, and may provide an interface through which other users may inquire the data registered in the server 300.

The developed fingerprint level determination apparatus 100 may be connected to the server 300 through the network 500. The developed fingerprint level determination apparatus 100 to which the disclosure is applied may be various types of information processing devices used by a user, for example, a personal computer (PC), a laptop computer, a mobile phone, a tablet PC, a smart phone, personal digital assistants (PDA), or the like. However, these are only example, and in addition to the above-described examples, the developed fingerprint level determination apparatus 100 should be interpreted as a concept including all devices capable of communication that are currently developed and commercialized or to be developed in the future. A method of determining the level of a developed fingerprint (200) provided according to an embodiment may be borrowed without limitation on any device as long as an application in which the method is programmed can be installed.

The network 500 connects the developed fingerprint level determination apparatus 100 to the server 300. For example, the network 500 provides a connection path such that the developed fingerprint level determination apparatus 100 may transmit and receive packet data after accessing the server 300.

Although not shown in the drawings, the server 300 according to an embodiment may include a memory, an input/output unit, a program storage unit, a control unit, and the like.

Figure 3:
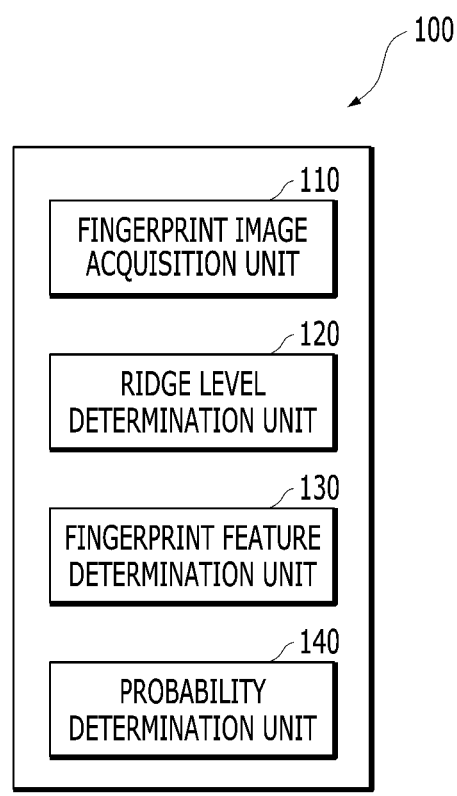
FIG. 3 is a block diagram of a developed fingerprint level determination apparatus of FIG. 2.

FIG. 3 is a block diagram of the developed fingerprint level determination apparatus 100 of FIG. 2.

The developed fingerprint level determination apparatus 100 according to an embodiment may correspond to at least one processor or may include at least one processor. Accordingly, the developed fingerprint level determination apparatus 100 may be driven in a form included in a hardware device such as a microprocessor or a general-purpose computer system.

The developed fingerprint level determination apparatus 100 in FIG. 3 shows only components associated with the present embodiment to prevent features of the present embodiment is blurred. Accordingly, it is to be understood by one of ordinary skill in the art that other general-purpose components may be further included in addition to the components shown in FIG. 3.

Referring to FIG. 3, the developed fingerprint level determination apparatus 100 according to an embodiment may include a fingerprint image acquisition unit 110, and may include at least one of a ridge level determination unit 120 and a fingerprint feature determination unit 130.

The fingerprint image acquisition unit 110 may obtain at least two or more developed fingerprint images according to a fingerprint development technique. In this case, the fingerprint image acquisition unit 110 may obtain at least two or more developed fingerprint images to which different development techniques are applied under an identical fingerprint shape and an identical fingerprint formation environment condition.

For example, the fingerprint image acquisition unit 110 may include a camera including a lens and an image sensor. The image sensor may convert an image input by the lens into an electrical signal, and may be a semiconductor device such as a charge-coupled device (CCD) or a complementary metal-oxide semiconductor (CMOS).

Here, a fingerprint image obtained by the fingerprint image acquisition unit 110 may be composed of pixels that can be expressed in two-dimensional coordinates.

Figure 4:
FIG. 4 is an exemplary view of obtained fingerprint images.

FIG. 4 is an exemplary view of obtained fingerprint images.

For example, for the same fingerprint type, different reagents such as Ninhydrin, 1, 2-IND, DFO, or Oil Red O may be used to develop latent fingerprints. In this case, by applying the same pressure, etc. to make the fingerprint formation environmental conditions the same, a developed fingerprint may be obtained as an image.

Referring to FIG. 4, as shown in FIGS. 4 (a), (b) and (c), fingerprint images may be obtained by developing the same fingerprint shape according to different development techniques.

The ridge level determination unit 120 may check respective ridge development level information of the obtained fingerprint images and compare the respective ridge development level information with each other.

The ridge development level information of the obtained fingerprint image may include a contrast value, a signal-to-noise ratio, or orientation and continuity of a ridge, of the obtained fingerprint image.

In this case, the contrast value of the obtained fingerprint image is calculated as follows.

A specific fingerprint development technique may affect not only ridges of a fingerprint but also the entire paper on which the fingerprint is imprinted. For example, a portion of a fingerprint that is developed using Oil Red O on the paper is dyed red, and a portion without the fingerprint is dyed with a paler pink.

Accordingly, the obtained fingerprint image is divided into several areas and the average of respective contrast values for the areas is calculated, thereby calculating a contrast value of the entire fingerprint image. This is to correct an error that may occur depending on distribution of ink and pressure or distribution of ridges that may occur when fingerprints develop.

In this case, assuming that the number of pixels in each area is $I_{x,y}$, the average of the number of pixels in each area is A, and the number of pixels in the entire fingerprint image is "number of pixels", the contrast value of the obtained fingerprint image may be expressed as Equation 1.

$$R_{RMS} = \sqrt{\frac{1}{\text{number of pixels} \times \sum (I_{x,y} - A)^2}} \quad \text{[Equation 1]}$$

The contrast value of the obtained fingerprint image may be expressed based on the number of pixels constituting the obtained fingerprint image.

Table 1 exemplarily shows contrast values of the fingerprint images (a), (b), and (c) of FIG. 4. The contrast values shown in Table 1 are values generalized to be distributed in a range of 0 to 1 for easy calculation.

TABLE 1

| Fingerprint image | (a) | (b) | (c) |
|---|---|---|---|
| Contrast value | 0.3767 | 0.2675 | 0.2224 |

Through comparison of the contrast values of the obtained fingerprint images, it can be seen how clearly a ridge portion of the fingerprint in the fingerprint image appears compared to a non-ridge portion. In this case, it can be determined that the higher the contrast value, the higher the level of fingerprint development. As such, by comparing the contrast values, the level of fingerprint development may be determined by the specific fingerprint development technique.

A signal-to-noise ratio (SNR) of the obtained fingerprint image is a measure indicating a ratio between a signal and noise. The SNR of the obtained fingerprint image may indicate how much noise is included in a fingerprint image signal. After a specific area in the fingerprint image is designated, it is divided into several areas, and the SNR is calculated for each area. The SNR may be expressed as in Equation 2 based on the number of pixels when the average of the number of pixels in each area is p and the standard deviation is a.

$$R_{SNR} = \frac{\mu}{\sigma} \quad \text{[Equation 2]}$$

Table 2 exemplarily shows SNRs of the fingerprint images (a), (b), and (c) of FIG. 4. Here, the higher the SNR, the higher the sharpness of the image.

TABLE 2

| Fingerprint image | (a) | (b) | (c) |
|---|---|---|---|
| SNR | 7.44 | 6.21 | 2.99 |

By calculating and quantifying the SNR of the obtained fingerprint image, it can be objectively checked that the level of a developed fingerprint varies according to physical conditions in which a fingerprint is formed, as well as the fingerprint development ability of the specific fingerprint development technique.

Figure 5:
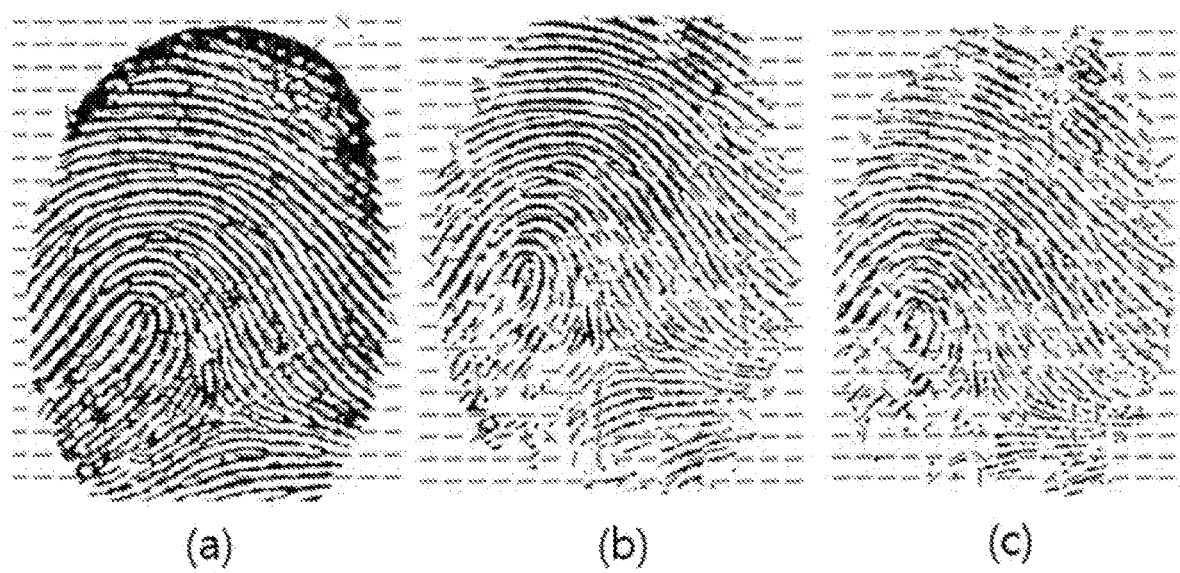
FIG. 5 is an exemplary view illustrating ridge orientations of the fingerprint images of FIG. 4.

FIG. 5 is an exemplary view illustrating ridge orientations of the fingerprint images of FIG. 4.

It is assumed that ridge continuity is excellent when the ridge orientations are uniform, and when the ridge continuity is excellent, ridges of a fingerprint are uniformly developed, which may be evaluated as an excellent development technique.

For example, after dividing an obtained fingerprint image into areas of a certain size, a Gaussian filter is applied to each area to measure the degree of change in numerical values on an x-axis and y-axis. Orientation and continuity of a ridge may be extracted by calculating and synthesizing covariance of the numerical distribution of the x-axis and y-axis measured in this way. In this case, a method of extracting ridge orientations of the obtained fingerprint image may include all methods applicable to one of skill in the art in addition to the present method.

Figure 6:
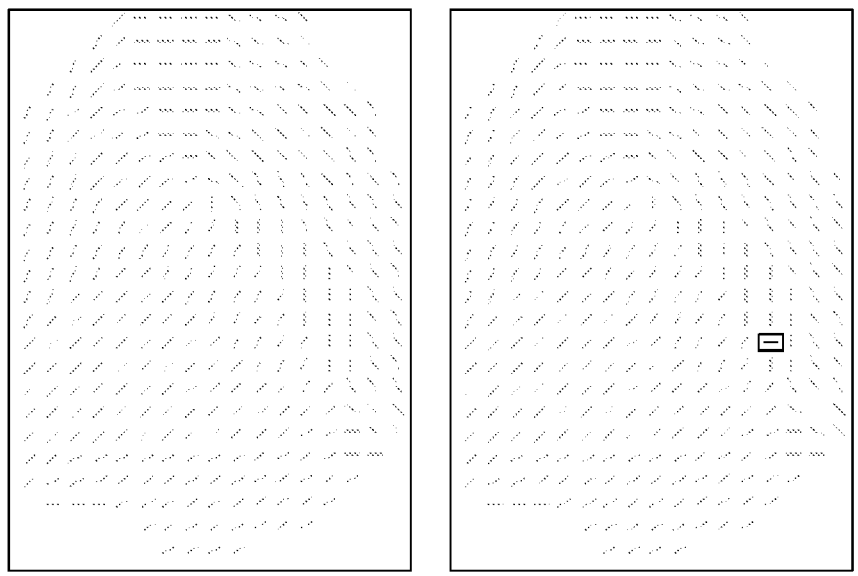
FIG. 6 is a view for explaining the meaning of a ridge orientation.

FIG. 6 is a view for explaining the meaning of a ridge orientation.

For example, compared with FIG. 6 (a), FIG. 6 (b) includes a marked portion in which ridge orientations are not uniform, so it can be evaluated that the ridge orientations are not continuous. Therefore, it can be evaluated that the marked portion of FIG. 6 (b) does not develop or has a problem, and a development technique of FIG. 6 (a) is relatively excellent.

On the other hand, orientation and continuity of a ridge may be determined even after error removal and thinning of an obtained fingerprint image is applied.

The fingerprint feature determination unit 130 may perform error removal and thinning of the obtained fingerprint image, check respective morphological feature information of the obtained fingerprint image, and compare the respective morphological feature information with each other.

Morphological feature information of the obtained fingerprint image may include the existence and number of minutiae, cores, or deltas of a fingerprint.

Figure 7:
FIG. 7 is an exemplary view of error-removing images of the fingerprint images of FIG. 4.

FIG. 7 is an exemplary view of error-removing images of the fingerprint images of FIG. 4.

As a method of removing an error of an obtained fingerprint image, grayscale transformation of the fingerprint image, generalization of the fingerprint image for each area divided by a certain size, fast Fourier transform, noise removal, or image binarization may be used. In addition to the methods listed above, all methods applicable to one of ordinary skill in the art may be included.

Figure 8:
FIG. 8 is an exemplary view of thinned images of the fingerprint images of FIG. 4.

FIG. 8 is an exemplary view of thinned images of the fingerprint images of FIG. 4. Thinning of a fingerprint image means fixing the thickness of a ridge in a fingerprint to a constant value of 1 pixel. In this way, a ridge may be simplified by thinning a fingerprint image, and morphological feature information may be checked.

Morphological feature information of an obtained fingerprint image may include the existence and number of minutiae, cores, or deltas of a fingerprint.

Figure 9:
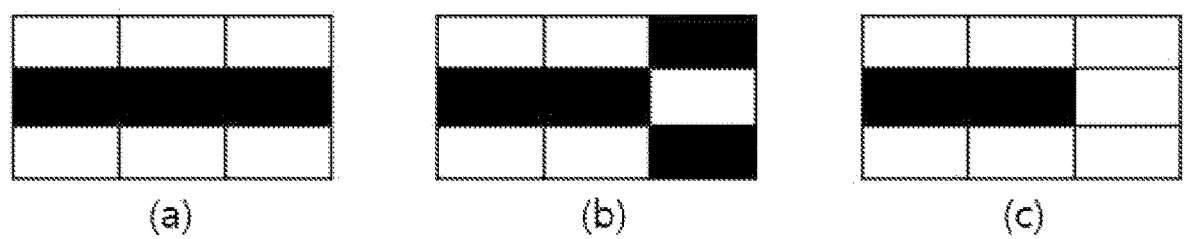
FIG. 9 is a view of types of minutiae that may be found in an obtained fingerprint image.

FIG. 9 is a view of types of minutiae that may be found in an obtained fingerprint image.

Minutiae of a fingerprint may be identified by segmenting a fingerprint image and measuring the number of pixels including ridges in the segmented area. The minutiae of the fingerprint may be checked through error removal and thinning of the obtained fingerprint image. FIG. 9 (a) shows a case where there is no minutiae, FIG. 9 (b) shows a bifurcation point, the point at which ridges are separated, and FIG. 9 (c) shows an ending point, which is the point at which the ridges in progress end.

Referring to FIG. 9, when the number of pixels in an area occupied by ridges is calculated based on an area in which the fingerprint image is divided into 9 pixels, if the number of pixels is 3, it indicates no minutiae, if the number of pixels is 4 or more, it indicates a bifurcation point, and if the number of pixels is 2 or less, it indicates an ending point. Accordingly, when the number of pixels in the obtained fingerprint image is other than 3, it can be considered that minutiae exist in the fingerprint image. As such, based on the number of pixels constituting the obtained fingerprint image, the existence and number of minutiae of a fingerprint may be determined.

Figure 10:
FIG. 10 is an exemplary view of cores of the fingerprint images of FIG. 4.

FIG. 10 is an exemplary view of cores of the fingerprint images of FIG. 4.

In the case of a core, by calculating the curvature of ridges in a fingerprint from an obtained fingerprint image, the existence may be checked at the point of maximum curvature, and the number may be determined.

In the case of a delta, the existence may be checked in the portion where the change in curvature within a narrow range is extreme in the obtained fingerprint image, and the number may be determined.

In this way, by checking the existence and number of minutiae, cores, or deltas of a fingerprint, it is possible to check whether morphological features are properly developed in the obtained fingerprint image.

The developed fingerprint level determination apparatus 100 of the disclosure may further include a probability determination unit 140.

The probability determination unit 140 may relatively determine the level of a developed fingerprint based on a comprehensive probability value calculated by deriving evaluation items from ridge development level information or morphological feature information of the obtained fingerprint image.

In this case, the comprehensive probability value may include a product of at least two or more of evaluation items including a contrast value, a signal-to-noise ratio, a core value, a delta value, or the number of minutiae, of the obtained fingerprint image.

The core value may have a value of 1 when a core exists in the obtained fingerprint image, and 0.5 when a core does not exist in the obtained fingerprint image, and the delta value may have a value of 1 when a delta exists in the obtained fingerprint image, and 0.5 when a delta does not exist in the obtained fingerprint image. The values when the core and the delta exist are relatively greater than the values when the core and the delta do not exist, respectively.

Accordingly, the comprehensive probability value may be exemplarily expressed as in Equation 3.

$$\text{COMPREHENSIVE PROBABILITY VALUE} = R_{RMS} \times R_{SNR} \times \text{CORE VALUE} \times \text{DELTA VALUE} \times \text{NUMBER OF MINUTIAE} \quad [\text{Equation 3}]$$

(where $R_{RMS}$ is the contrast value of the fingerprint image, and $R_{SNR}$ is the SNR of the fingerprint image)

By comparing comprehensive probability values calculated by different fingerprint development techniques, it is evaluated that the fingerprint development technique with a greater numerical value has better fingerprint development ability. Through this method, a relative difference in fingerprint development levels is determined.

In addition, the developed fingerprint level determination apparatus 100 may include a communication unit, a storage unit, a display unit, a processor, and the like.

The communication unit may provide an interface for communication with other systems or devices, and the storage unit may store data such as a basic program, an application program, and setting information for the operation of the developed fingerprint level determination apparatus 100. The display unit may perform functions for outputting information in the form of numbers, characters, images, graphics, and the like. The input unit may detect an input from the outside (e.g., a user) and provide data corresponding to the input to the processor. In addition, the processor may control all operations of the developed fingerprint level determination apparatus 100.

Hereinafter, a method of determining the level of a developed fingerprint according to embodiments will be described.

The method of determining the level of a developed fingerprint according to embodiments may include the following methods.

Check and Comparison of Ridge Development Level Information

According to one or more embodiments, a method of determining the level of a developed fingerprint includes obtaining at least two or more developed fingerprint images according to a fingerprint development technique, checking respective ridge development level information of the obtained fingerprint images, and comparing the respective ridge development level information of the obtained fingerprint images with each other.

Check and Comparison of Morphological Feature Information

A method of determining the level of a developed fingerprint according to an embodiment may include obtaining at least two or more developed fingerprint images according to a fingerprint development technique, checking respective morphological feature information of the obtained fingerprint images by performing error removal and thinning of the obtained fingerprint images, and comparing the respective morphological feature information of the obtained fingerprint images with each other.

Figure 11:
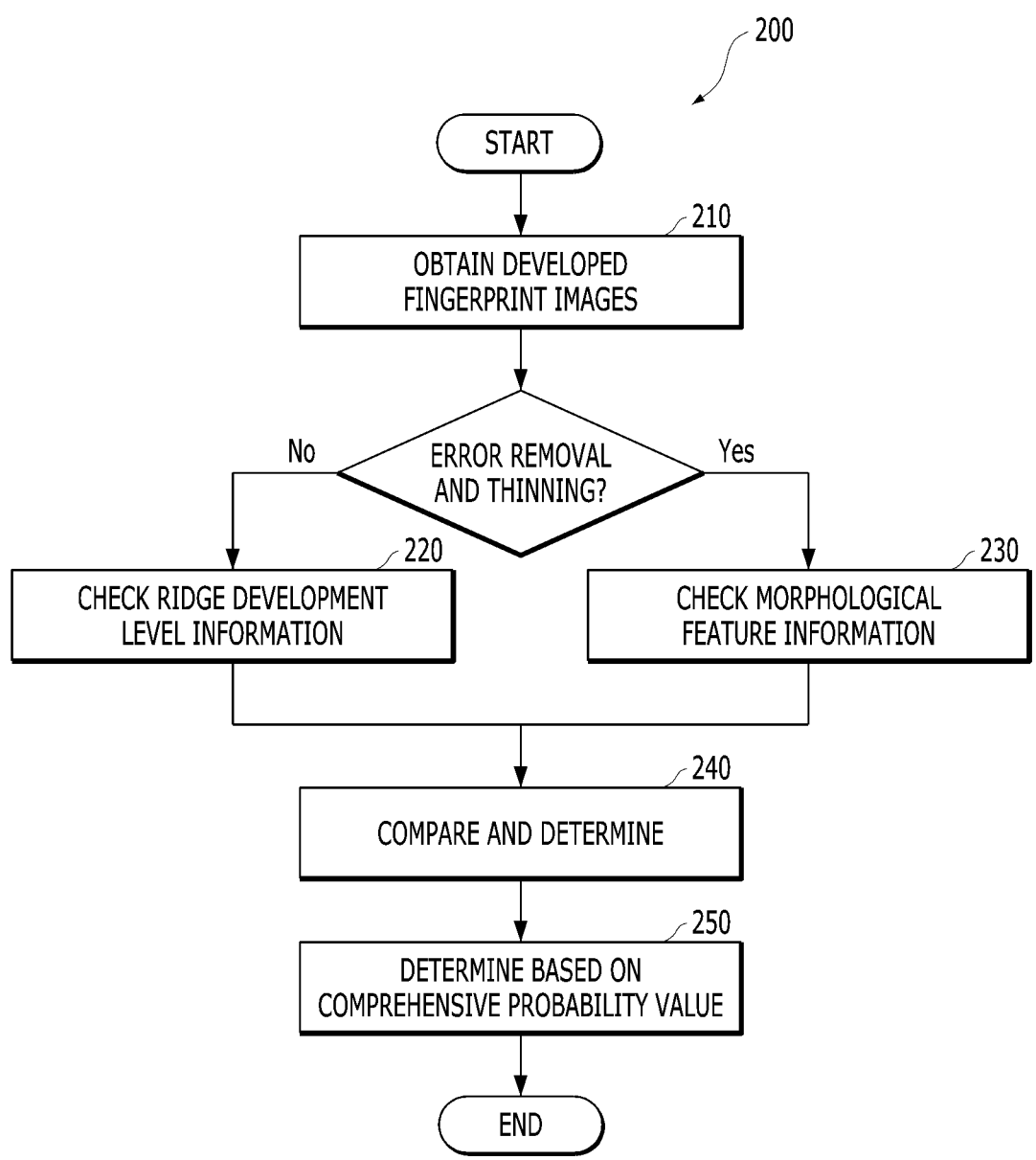
FIG. 11 is a flowchart illustrating a method of determining the level of a developed fingerprint according to an embodiment.

Check and Comparison of Ridge Development Level Information and Morphological Feature Information FIG. 11 is a flowchart illustrating a method of determining the level of a developed fingerprint according to an embodiment.

Referring to FIG. 11, a method of determining the level of a developed fingerprint (200) according to an embodiment may include operation 210 of obtaining at least two or more developed fingerprint images according to a fingerprint development technique, operation 220 of checking ridge development level information of the obtained fingerprint images, operation 230 of checking morphological feature information of the obtained fingerprint images by performing error removal and thinning of the obtained fingerprint images, and operation 240 of comparing the ridge development level information and the morphological feature information of the obtained fingerprint images with each other.

In the above methods, the ridge development level information of the obtained fingerprint image may include a contrast value, a signal-to-noise ratio, or orientation and continuity of a ridge, of the obtained fingerprint image.

In this case, the contrast value of the obtained fingerprint image may be expressed as in Equation 1 as described above, and the SNR may be expressed based on the number of pixels displayed in the fingerprint image as shown in Equation 2. With the contrast value and the SNR of the obtained fingerprint image, it is possible to objectively check not only the fingerprint development ability of a specific fingerprint development technique, but also how selectively a fingerprint can be developed.

In addition, the orientation and continuity of a ridge may be checked from the obtained fingerprint image, and may be checked even after error removal and thinning of the obtained fingerprint image are performed. It is assumed that the ridge continuity is excellent when ridge orientations are uniform, and when the ridge continuity is excellent, ridges of a fingerprint are uniformly developed, which may be evaluated as an excellent development technique.

In the above methods, the morphological feature information of the obtained fingerprint image may include the existence and number of minutiae, cores, or deltas of a fingerprint. By checking the existence and number of minutiae, cores, or deltas of a fingerprint in the obtained fingerprint image, the level of fingerprint development may be determined.

Furthermore, the method of determining the level of a developed fingerprint according to an embodiment may further include operation 250 of relatively determining the level of a developed fingerprint based on a comprehensive probability value calculated by deriving evaluation items from the ridge development level information or the morphological feature information of the obtained fingerprint images. In this case, the comprehensive probability value may include a product of at least two or more of the evaluation items including a contrast value, a signal-to-noise ratio, a core value, a delta value, or the number of minutiae, of the obtained fingerprint images.

In this case, the comprehensive probability value may be exemplarily expressed as in Equation 3 above.

An apparatus and a method according to an embodiment may be implemented as program instructions that can be executed by one or more processors or by various computer devices, and recorded on a computer-readable recording medium. The computer-readable recording medium may include program instructions, data files, data structures or a combination thereof. Program instructions recorded on the medium may be particularly designed and structured for embodiments or available to one of ordinary skill in a field of computer software. Examples of the computer-readable recording medium include magnetic media, such as a hard disc, a floppy disc, and magnetic tape; optical media, such as a compact disc-read only memory (CD-ROM) and a digital versatile disc (DVD); magneto-optical media, such as floptical discs; and hardware devices that are specially configured to store and carry out program commands (e.g., ROMs, random-access memories (RAMs), or flash memories). Program commands may include, for example, high-level language code that can be executed by a computer using an interpreter, as well as machine language code made by a complier. The above hardware devices may be configured to operate as one or more software modules to perform the operations of the embodiments, and vice versa.

As described above, the developed fingerprint level determination apparatus 100 and the method (200) according to embodiments may determine and evaluate the levels of respective fingerprints developed by different reagents or in environments according to ridge development level information (including a contrast value, a signal-to-noise ratio, or orientation and continuity of a ridge, of the obtained fingerprint image) or morphological feature information (including the existence and number of minutiae, cores, or deltas of a fingerprint) of the obtained fingerprint image.

The embodiments may calculate a comprehensive probability value by deriving evaluation items based on the ridge development level information and the morphological feature information of the obtained fingerprint image. As described above, by comparing comprehensive probability values with each other, the levels of relative fingerprints developed by different reagents or in environments may be evaluated, thereby providing a criterion for selecting a relatively superior fingerprint development technique.

As such, it is expected to contribute to the development of forensic research by making it possible to select effective and excellent fingerprint development techniques and reagents by objectifying the evaluation of reagents and technologies for latent fingerprint development in criminal investigations according to more quantified standards.

According to an embodiment, a developed fingerprint image according to a fingerprint development technique may be obtained, and a criterion for evaluating the level of a developed fingerprint in consideration of ridges and morphological features of the fingerprint may be provided.

In addition, an embodiment may provide a criterion for selecting a relatively superior fingerprint development method by deriving evaluation items capable of evaluating the level of a developed fingerprint and then calculating a comprehensive probability value.

Although the embodiments have been described with reference to the accompanying drawings, one of ordinary skill in the art will understand that various changes and modifications may be made therein. For example, the relevant results may be achieved even when the described technologies are performed in a different order than the described methods, and/or even when the described elements such as systems, structures, devices, and circuits are coupled or combined in a different form than the described methods or are replaced or substituted by other elements or equivalents.

In this regard, the present embodiments may have different forms and should not be construed as being limited to the descriptions set forth herein. While the disclosure has been particularly shown and described with reference to embodiments thereof, it will be understood that various changes in form and details may be made therein without departing from the spirit and scope of the following claims.

What is claimed is:

1. A developed fingerprint level determination apparatus comprising:
   a fingerprint image acquisition unit configured to obtain at least two or more developed fingerprint images according to different fingerprint development techniques;
   a ridge level determination unit configured to check respective ridge development level information of the obtained fingerprint images and compare the respective ridge development level information with each other;
   a fingerprint feature determination unit, by performing error removal and thinning of the obtained fingerprint images, configured to check respective morphological feature information of the obtained fingerprint images and compare the respective morphological feature information with each other; and
   a probability determination unit configured to relatively determine the level of a developed fingerprint based on a comprehensive probability value calculated by deriving evaluation items from the ridge development level information or the morphological feature information of the obtained fingerprint image.

2. The developed fingerprint level determination apparatus of claim 1, wherein ridge development level information of the obtained fingerprint image comprises:
   a contrast value, a signal-to-noise ratio, or orientation and continuity of a ridge of the obtained fingerprint image.

3. The developed fingerprint level determination apparatus of claim 1, wherein morphological feature information of the obtained fingerprint image comprises:
   the existence and number of minutiae, cores, or deltas of a fingerprint in the obtained fingerprint image.

4. The developed fingerprint level determination apparatus of claim 1, wherein the comprehensive probability value comprises:
   a product of at least two or more of evaluation items including a contrast value, a signal-to-noise ratio, a core value, a delta value, or the number of minutiae, of the obtained fingerprint image.

5. A method of determining the level of a developed fingerprint, the method comprising:
   obtaining at least two or more developed fingerprint images according to different fingerprint development techniques;
   checking ridge development level information of the obtained fingerprint images;
   checking morphological feature information of the obtained fingerprint images by performing error removal and thinning of the obtained fingerprint images;

comparing the ridge development level information and the morphological feature information of the obtained fingerprint images with each other; and relatively determining the level of a developed fingerprint based on a comprehensive probability value calculated by deriving evaluation items from the ridge development level information or the morphological feature information of the obtained fingerprint image.

6. The method of claim 5, wherein the ridge development level information of the obtained fingerprint image comprises:

a contrast value, a signal-to-noise ratio, or orientation and continuity of a ridge, of the obtained fingerprint image.

7. The method of claim 5, wherein the morphological feature information of the obtained fingerprint image comprises:

the existence and number of minutiae, cores, or deltas of a fingerprint in the obtained fingerprint image.

8. A non-transitory computer-readable recording medium having recorded thereon a program for executing the method of claim 5.

* * * * *